(12) United States Patent
Lu et al.

(10) Patent No.: US 10,792,767 B2
(45) Date of Patent: Oct. 6, 2020

(54) LASER PREHEATING CONTROL METHOD AND DEVICE

(71) Applicants: METAL INDUSTRIES RESEARCH & DEVELOPMENT CENTRE, Kaohsiung (TW); PARFAITE TOOL CO., LTD., Tainan (TW)

(72) Inventors: Yu-Ting Lu, Kaohsiung (TW); Yu-Fu Lin, Kaohsiung (TW); Jui-Teng Chen, Tainan (TW); Wen-Long Chang, Taichung (TW); Chih-Hung Chou, Tainan (TW)

(73) Assignees: Metal Industries Research & Development Centre, Kaohsiung (TW); Parfaite Tool Co., Ltd., Tainan (TW)

( * ) Notice: Subject to any disclaimer, the term of this patent is extended or adjusted under 35 U.S.C. 154(b) by 377 days.

(21) Appl. No.: 15/854,127

(22) Filed: Dec. 26, 2017

(65) Prior Publication Data
US 2019/0143457 A1  May 16, 2019

(30) Foreign Application Priority Data
Nov. 15, 2017  (TW) .............................. 106139574 A

(51) Int. Cl.
*B23K 26/40*  (2014.01)
*B23K 26/70*  (2014.01)
(Continued)

(52) U.S. Cl.
CPC .......... *B23K 26/40* (2013.01); *B23K 26/0093* (2013.01); *B23K 26/70* (2015.10); *B23P 25/006* (2013.01); *B28D 1/32* (2013.01)

(58) Field of Classification Search
CPC ... B23K 26/70; B23K 26/0093; B23P 25/006; B28D 1/32
(Continued)

(56) References Cited

U.S. PATENT DOCUMENTS 8,847,114 B1 * 9/2014 Shin ...................... B23K 26/02
                                                        219/121.71
2014/0371900 A1    12/2014 Lee et al.

FOREIGN PATENT DOCUMENTS

CN       1554510 A     12/2004
CN     102030468 A      4/2011
(Continued)

OTHER PUBLICATIONS

Chinese Office Action dated Mar. 25, 2020 for Chinese Patent Application No. 201711228412.0, 8 pages.
(Continued)

*Primary Examiner* — Christine J Skubinna
(74) *Attorney, Agent, or Firm* — Demian K. Jackson; Jackson IPG PLLC

(57) ABSTRACT

A laser preheating control method is applied to a laser preheating control device. When a cutter processes a workpiece along a process path, a laser source of the device is provided to output a laser beam to the workpiece for selectively forming a laser spot on the workpiece surface. And according to a movement direction of the cutter, a laser controller of the device is provided to form the laser spot only on a preheating region of the workpiece, where in front of the cutter in the process path, for preheating the workpiece in the preheating region. As a result, the laser spot will not repeatedly heat the workpiece behind the cutter in the process path, and the qualitative change of the workpiece caused by repeating heating is preventable.

16 Claims, 5 Drawing Sheets

(51) Int. Cl.
    *B23P 25/00*     (2006.01)
    *B28D 1/32*     (2006.01)
    *B23K 26/00*     (2014.01)

(58) Field of Classification Search
    USPC .................................................. 219/121.67
    See application file for complete search history.

(56) References Cited

FOREIGN PATENT DOCUMENTS

| | | |
|---|---|---|
| CN | 203265880 U | 11/2013 |
| CN | 104674211 A | 6/2015 |
| CN | 205816815 U | 12/2016 |
| CN | 107020520 A | 8/2017 |
| CN | 107234141 A | 10/2017 |
| ES | 2239514 A1 | 9/2005 |
| TW | 356613 | 4/1999 |
| TW | I268456 B | 7/2006 |
| TW | I508810 | 11/2015 |
| TW | 201725082 A | 7/2017 |

OTHER PUBLICATIONS

Taiwanese Office Action dated Nov. 6, 2018 for Taiwanese Patent Application No. 106139574, 8 pages.

\* cited by examiner

LASER PREHEATING CONTROL METHOD AND DEVICE

FIELD OF THE INVENTION

This invention generally relates to laser preheating control method and device, and more particularly to laser preheating control method and device which are able to prevent qualitative changes of a workpiece caused by repeating heating.

BACKGROUND OF THE INVENTION

Please referring Taiwan patent I508810 "Laser-assisted machining device", a splitter module is provided to split a laser main beam, which is generated by a laser generating unit, into multiple laser sub-beams, and the laser sub-beams continuously and respectively irradiate multiple processing regions defined by a cutter's blades. Owing to the laser sub-beams are rotated together with the cutter, they will heat a circular processing region around the cutter continuously. Not only the workpiece in front of the cutter, but also the workpiece behind the cutter will be soften by the heat of the laser sub-beams, so may cause qualitative changes of the processed workpiece.

SUMMARY

The object of the present invention is to provide a laser preheating control method, and the method is applied to a laser preheating control device, which includes a laser source and a laser controller. The laser source is configured to output a laser beam to a workpiece, and when a cutter processes the workpiece along a process path, the laser beam and the cutter move together relative to the workpiece, and the laser beam is provided to selectively form a laser spot on the workpiece. The method includes two steps: i) utilizing the laser controller to obtain a movement direction of the cutter on the workpiece, and ii) utilizing the laser controller to form the laser spot only on a preheating region of the workpiece according to the movement direction of the cutter. A circular region around the cutter is formed by the preheating region and a non-preheating region, the preheating region is located ahead of the cutter in the process path, and the non-preheating region is located behind the cutter in the process path. The laser spot is provided to move from one end to the other end of the preheating region for preheating the workpiece in the preheating region when the cutter processes the workpiece along the process path.

The other object of the present invention is to provide a laser preheating control device which includes a laser source and a laser controller. The laser source is configured to output a laser beam to a workpiece, wherein when a cutter processes the workpiece along a process path, the laser beam and the cutter move together relative to the workpiece, and the laser beam is provided to selectively form a laser spot on the workpiece. The laser controller is configured to obtain a movement direction of the cutter on the workpiece and form the laser spot only on a preheating region of the workpiece according to the movement direction of the cutter, wherein a circular region around the cutter is formed by the preheating region and a non-preheating region, the preheating region is located ahead of the cutter in the process path, and the non-preheating region is located behind the cutter in the process path, and wherein the laser spot is provided to move from one end to the other end of the preheating region for preheating the workpiece in the preheating region when the cutter processes the workpiece along the process path.

For improving process efficiency, the laser spot is only formed on the preheating region of the workpiece during processing, for softening the workpiece in the preheating region. Owing to the laser spot will not be formed on the non-preheating region of the workpiece, where behind the cutter in the process path, qualitative changes caused by repeating heating will not occur on the processed workpiece behind the cutter in the process path.

DETAILED DESCRIPTION OF THE INVENTION

Figure 1:
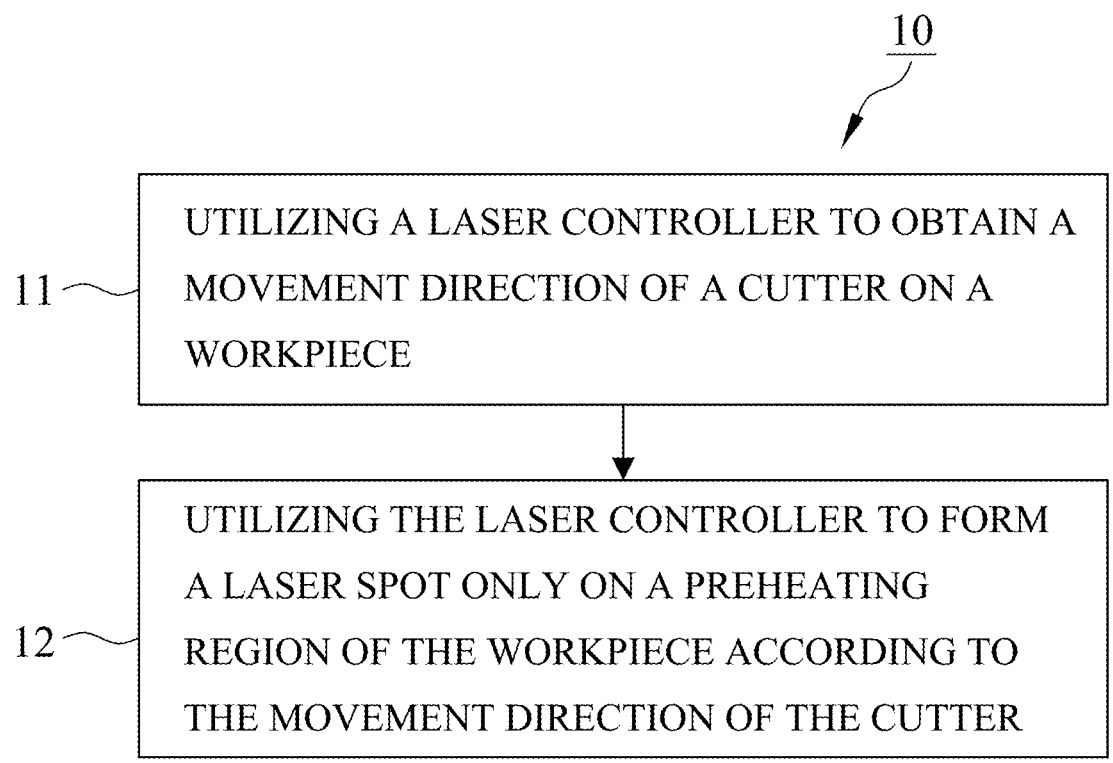
FIG. 1 is a flowchart illustrating a laser preheating control ethod in accordance with one embodiment of the present invention.

With reference to FIG. 1, a laser preheating control method 10 of the present invention includes step 11 of utilizing a laser controller to obtain a movement direction of a cutter on a workpiece, step 12 of utilizing the laser controller to form a laser spot only on a preheating region of the workpiece according to the movement direction of the cutter.

Figure 2:
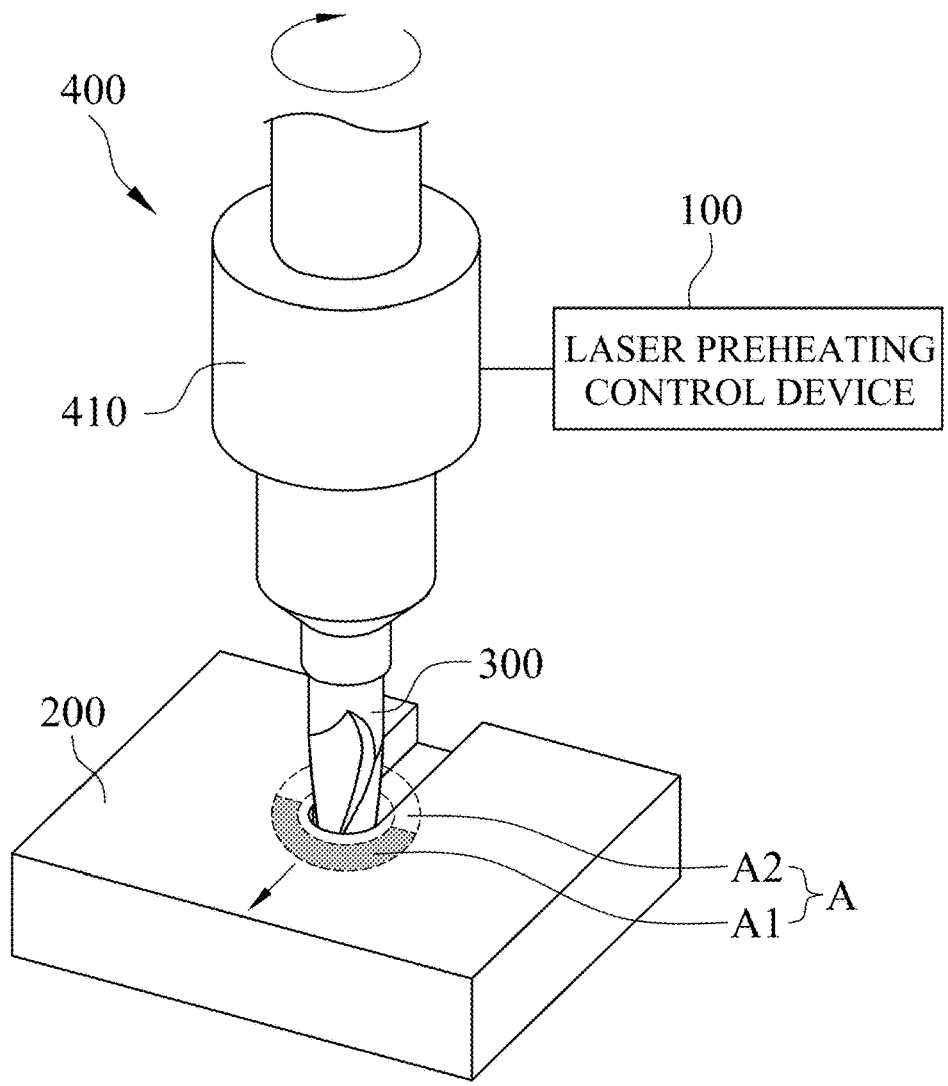
FIG. 2 is a diagram illustrating the laser preheating control method in accordance with one embodiment of the present invention.
Figure 3:
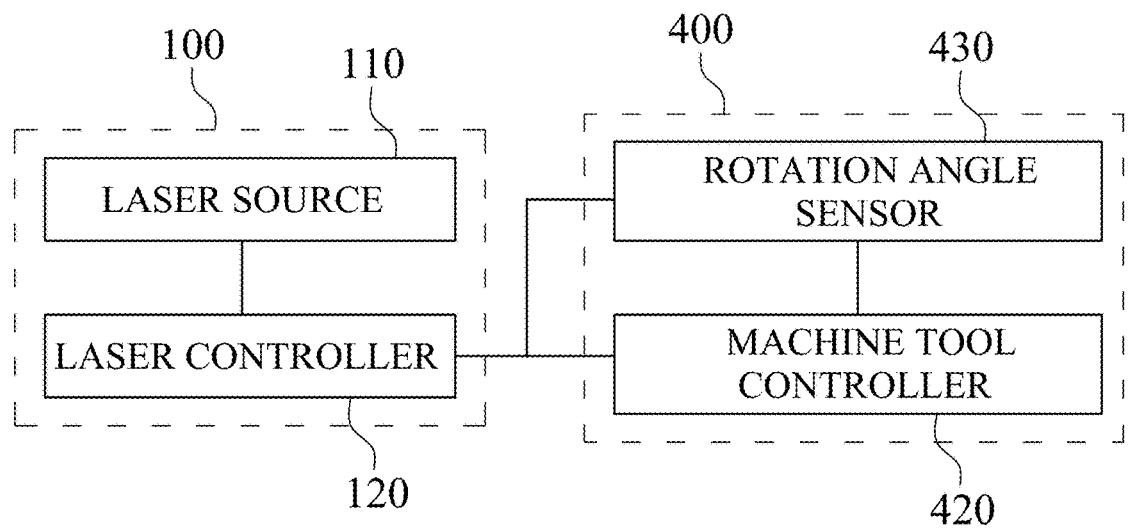
FIG. 3 is a perspective diagram illustrating a laser preheating control device and a machine tool in accordance with one embodiment of the present invention.

With reference to FIGS. 2 and 3, the laser preheating control method 10 is applied to a laser preheating control device 100, which includes a laser source 110 and a laser controller 120. The laser source 110 is configured to output a laser beam to a workpiece 200, when a cutter 300 processes the workpiece 200 along a process path, the laser beam and the cutter 300 move together relative to the workpiece 200, and the laser beam is provided to selectively form a laser spot on the surface of the workpiece 200. In the embodiment of FIG. 2, the cutter 300 and the laser source 110 are mounted on a main shaft 410 of a machine tool 400, and the cutter 300 is a milling cutter. The laser source 110 is configured to direct the laser beam to the front of the milling cutter's blade, such that when the machine tool 400 drives the milling cutter to mill the workpiece 200 along the process path, the laser beam not only moves together with the milling cutter relative to the workpiece 200, but also rotates together with the blade of the milling cutter.

With reference to FIGS. 1 to 3, in step 11 of the laser preheating control method 10, the laser controller 120 of the laser preheating control device 100 is configured to obtain a movement direction of the cutter 300 on the workpiece 200. Preferably, the laser controller 120 is coupled to a machine tool controller 420 of the machine tool 400, the machine tool controller 420 is configured to control the cutter 300 to process the workpiece 200 following the process path, and is also configured to provide the movement direction information of the cutter 300 to the laser controller 120.

With reference to FIGS. 1 and 2, in step 12 of the laser preheating control method 10, the laser controller 120 is configured to determine the laser spot-forming region depending on the movement direction of the cutter 300, and is configured to allow the laser beam to form the laser spot only on a preheating region A1 for preheating the workpiece 200 in the preheating region A1.

With reference to FIG. 2, a circular region A is formed by the preheating region A1 and a non-preheating region A2, the preheating region A1 is located ahead of the cutter 300 in the process path, and the non-preheating region A2 is located behind the cutter 300 in the process path. The circular region A is defined by the laser beam which rotates together with the cutter 300 in a circular path when the laser source 110 is lighted continuously, i.e., the circular region A is the region where the laser beam forms the laser spot on the surface of the workpiece 200. As a result, the circular region A circles around the cutter 300.

With reference to FIGS. 2 and 3, the machine tool 400 preferably further includes a rotation angle sensor 430 which is mounted in the main shaft 410 of the machine tool 400, and the rotation angle sensor 430 is configured to detect a rotation angle of the cutter 300. The laser controller 120 is coupled to the laser source 110 and the rotation angle sensor 430 respectively, for this reason, the laser controller 120 can selectively light the laser source 110 according to the rotation angle of the cutter 300 to form the laser spot only on the preheating region A1 of the workpiece 200. In this embodiment, the rotation angle sensor 430 is an encoder configured to detect the rotation angle of the blade of the cutter 300, and the user can edit and write GM code for switching the laser source 110 on or off. However, the present invention is not limited to this respect. For example, in other embodiments, the laser preheating control device 100 can control the laser beam to form the laser spot only on the preheating region A1 of the workpiece 200 by a laser cover which can selectively block the laser beam.

By the time the laser controller 120 determines that the blade of the cutter 300 rotates to the front side based on the rotation angle of the cutter 300, the laser controller 120 will turn on the laser source 110 for directing the laser beam toward the workpiece 200 and forming the laser spot on the preheating region A1 of the workpiece 200, and the laser spot will follow the blade of the cutter 300 to move from one end to the other end of the preheating region A1 because the laser beam rotate together with the cutter 300. On the other hand, while the laser controller 120 determines that the blade of the cutter 300 rotates to the rear side, the laser controller 120 will turn off the laser source 110 and the laser spot will not be formed on the non-preheating region A2 of the workpiece 200.

Preferably, the circular region A is partitioned into 2 to 12 sub-regions by the laser controller 120, and the angle of each of the sub-regions is between 30 and 180 degrees. In more detail, the angle of each of the sub-regions is 180 degrees when the circular region A is divided into two sub-regions (1-180° and 181-360°), the angle of each of the sub-regions is 60 degrees when the circular region A is divided into six regions (1-60°, 61-120°, 121-180°, 181-240°, 241-300° and 301-360°), and the angle of each of the sub-regions is 30 degrees when the circular region A is divided into twelve regions (1-30°, 31-60°, 61-90°, 91-120°, 121-150°, 151-180°, 181-210°, 211-240°, 241-270°, 271-300°, 301-330° and 331-360°).

If the circular region A is partitioned into two sub-regions, the sub-region corresponding to the movement direction of the cutter 300 is determined as the preheating region A1, and the other sub-region is determined as the non-preheating A2.

Figure 4A:
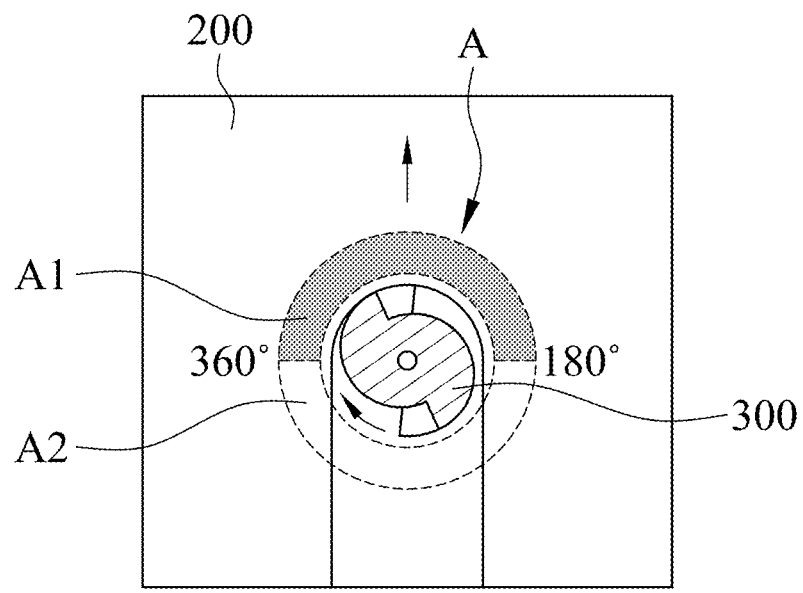
FIGS. 4a and 4b are diagrams illustrating the laser preheating control method in accordance with one embodiment of the present invention.

With reference to FIG. 4a, when the cutter 300 moves toward the direction of 90°, the sub-region of 1-180° in the circular region A is corresponding to the movement direction. As a result, the laser controller 120 determines the sub-region of 1-180° is the preheating region A1 and determines the sub-region of 181-360° is the non-preheating region A2. The laser controller 120 will switch on the laser source 110 while the blade of the cutter 300 rotating into the preheating region A1 (1-180°), and the laser spot will be formed on the surface of the workpiece 200 where in the preheating region A1 and move from one end to the other end of the preheating region A1 together with the blade of the cutter 300, for softening the workpiece 200 in the preheating region A1. And the laser controller 120 will immediately switch off the laser source 110 when the blade of the cutter 300 rotating into the non-preheating region A2 from the preheating region A1. So the laser spot will not be formed to heat the workpiece 200 in the non-preheating region A2. And when the blade of the cutter 300 rotates into the preheating region A1 again, the laser controller 120 will switch on the laser source 110 again for preheating the workpiece 200 in the preheating region A1.

Figure 4B:
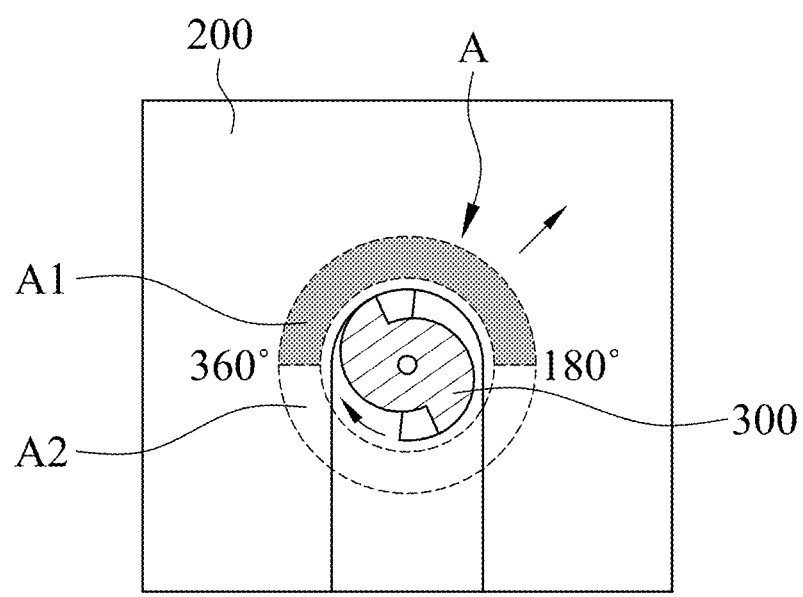

With reference to FIG. 4b, if the cutter 300 moves toward the direction of 135° from the direction of 90% the sub-region corresponding to the movement direction is the same sub-region (1-180° in the circular region A and the preheating region A1 is still the sub-region of 1-180°).

When the circular region A is divided into six sub-regions, the sub-region corresponding to the movement direction of the cutter 300 and its two adjacent sub-regions are determined as the preheating region A1, and the other sub-regions are determined as the non-preheating region A2. However, the present invention is not limited to this determination rule. The laser controller 120 can only determine the sub-region corresponding to the movement direction of the cutter 300 as the preheating region A1.

Figure 5A:
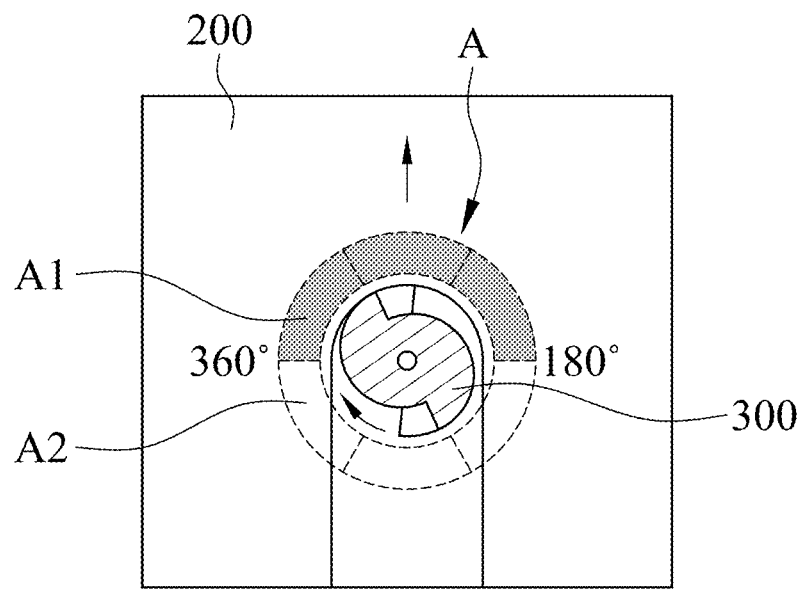
FIGS. 5a and 5b are diagrams illustrating the laser preheating control method in accordance with one embodiment of the present invention.

With reference to FIG. 5a, the sub-region of 61-120° in the circular region A is corresponding to the movement direction when the cutter 300 moving toward the direction of 90°, so the sub-region of 61-120° and the adjacent sub-regions of 1-60° and 121-180° are determined as the preheating region A1 (1-180°), and the other sub-regions of 181-240°, 241-300° and 301-360° are determined as the non-preheating region A2 (181-360°). The laser controller 120 can turn on the laser source 110 and direct the laser beam to form the laser spot on the preheating region A1 of the workpiece 200 when the blade of the cutter 300 rotating into the preheating region A1 (1-180°), and the laser spot can move from one end to the other end of the preheating region A1 to soften the workpiece 200 in the preheating region A1. After that, the laser controller 120 will turn off the laser source 110 when the blade of the cutter 300 rotating into the non-preheating region A2 (181-360°).

Figure 5B:
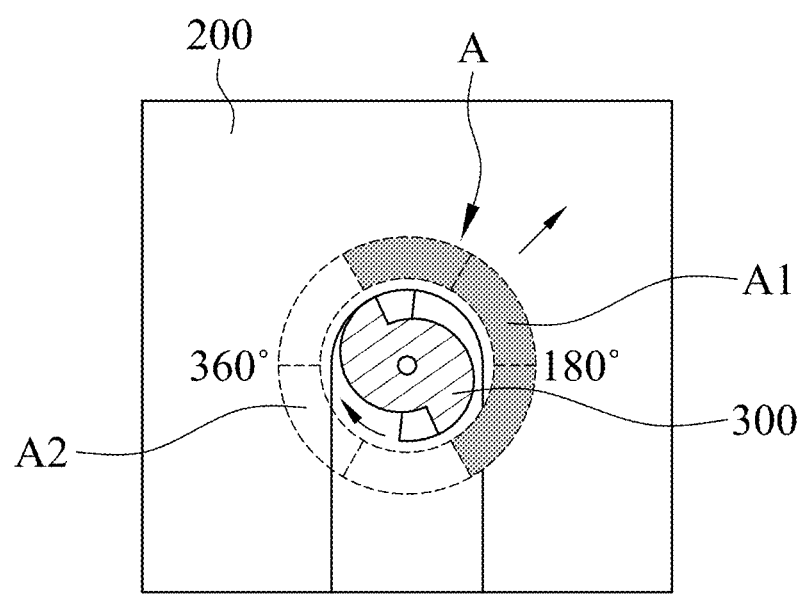

With reference to FIG. 5b, when the movement direct of the cutter 300 changes to 135° from 90°, the laser controller 120 determines the sub-region of 121-180° in the circular region A, which is corresponding to the movement direction, and the adjacent sub-regions of 61-120° and 181-240° as the preheating region A1 (61-240°), and determines the other sub-regions of 241-300°, 301-360° and 1-60° as the non-preheating region A2 (241-60°). In the same way, the laser controller 120 will switch on the laser source 110 to form the laser spot on the preheating region A1 of the workpiece 200 when the blade of the cutter 300 rotating into the preheating region A1 (61-240°), and will switch off the laser source 110 when the blade of the cutter 300 rotating into the non-preheating region A2 (241-60°).

If the circular region A is divided into twelve sub-regions, the laser controller 120 determines the sub-region corresponding to the movement direction of the cutter 300 and its two adjacent sub-regions as the preheating region A1 and determines the other sub-regions as the non-preheating region A2. But the present invention is not limited to this determination rule, the corresponding sub-region and the four adjacent sub-regions in the circular region A can be determined as the preheating region A1.

Figure 6A:
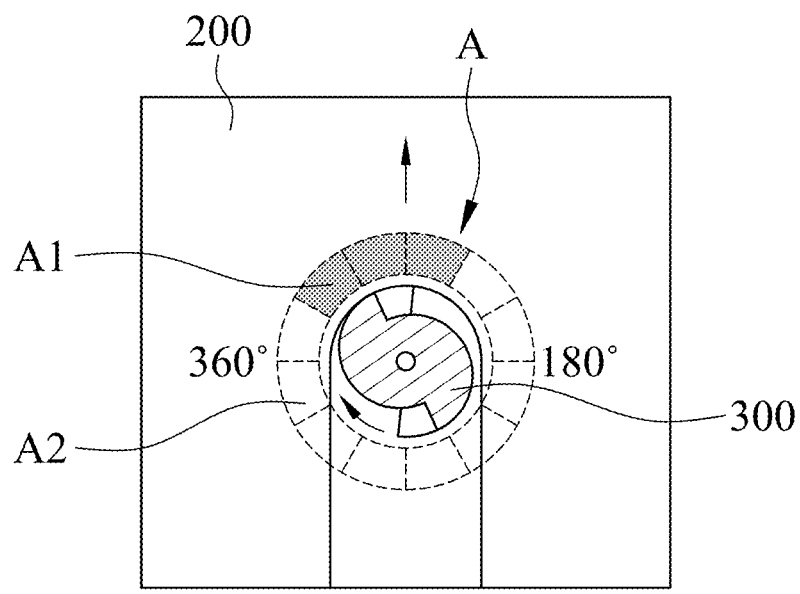
FIGS. 6a and 6b are diagrams illustrating the laser preheating control method in accordance with one embodiment of the present invention.

With reference to FIG. 6a, the corresponding sub-region is the region of 61-90° when the movement direction of the cutter 300 is 90°. As a result, the laser controller 120 determines the sub-region of 61-90° and the two adjacent sub-regions of 31-60° and 91-120° as the preheating region A1 (31-120°), and determines the other sub-regions of 121-150°, 151-180°, 181-210°, 211-240°, 214-270°, 271-300°, 301-330°, 331-360° and 1-30° as the non-preheating region A2 (121-30°). The laser controller 120 will switch on the laser source 110 to form the laser spot to soften the workpiece 200 in the preheating region A1 when the blade of the cutter 300 rotating into the preheating region A1 (31-120°), and will switch off the laser source 110 when the blade of the cutter 330 rotating into the non-preheating region A2 (121-30°).

Figure 6B:
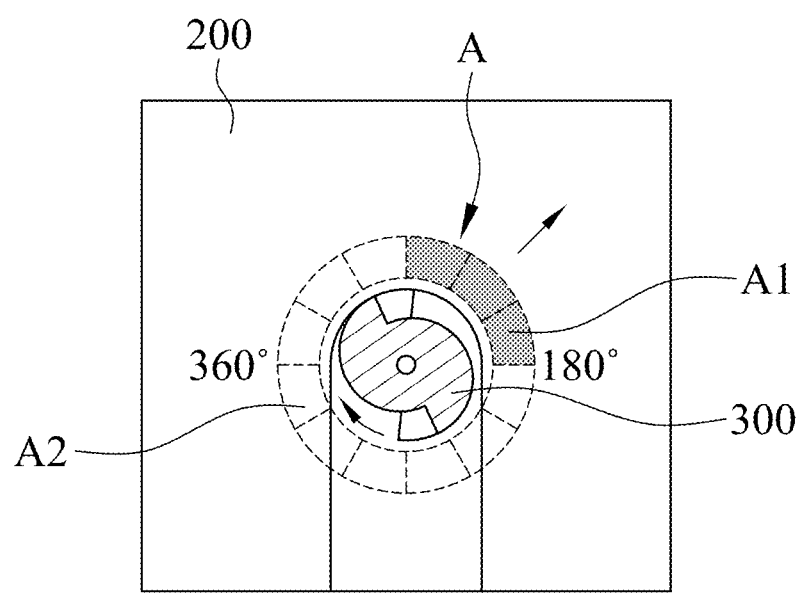

With reference to FIG. 6b, if the cutter 300 moves from the direction of 90° toward the direction of 135°, the corresponding sub-region is the region of 121-150°, and the sub-region of 121-150° and the adjacent sub-regions of 91-120° and 151-180° will be determined as the preheating region A1 (91-180°), and the other sub-regions will be determined as the non-preheating region A2 (181-90°). And the laser source 110 will be switched on by the laser controller 120 to form the laser spot in the preheating region A1 when the blade of the cutter 300 rotating into the preheating region A1 (91-180°). On the other hand, the laser source 110 will be switched off by the laser controller 120 when the blade rotating into the non-preheating region A2 (181-90°).

As mentioned above, the angle range of the preheating region A1 is between 90 and 180 degrees according to the rules of the laser controller 120 how to divide the circular region A and how to determine the preheating region A1. Such that the angle range of the non-preheating region A2 is between 180 and 270 degrees. In the present invention, the laser controller 120 is provided to form the laser spot only in the preheating region A1 where is located ahead of the cutter 300 in the process path. The qualitative changes of the workpiece 200 caused by repeating heating is preventable because only the workpiece 200 in front of the cutter 300 in the process path will be preheated and softened by the laser spot, the processed workpiece 200 behind the cutter 300 in the process path will not be heated repeatedly.

While this invention has been particularly illustrated and described in detail with respect to the preferred embodiments thereof, it will be clearly understood by those skilled in the art that is not limited to the specific features shown and described, and various modified and changed in form and details may be made without departing from the spirit and scope of this invention.

What is claimed is:

1. A laser preheating control method applied to a laser preheating control device comprising a laser source and a laser controller, the laser source is configured to output a laser beam to a workpiece, wherein when a cutter processes the workpiece along a process path, the laser beam and the cutter move together relative to the workpiece, and the laser beam is provided to selectively form a laser spot on the workpiece, and the control method comprising:
   utilizing the laser controller to obtain a movement direction of the cutter on the workpiece; and
   utilizing the laser controller to form the laser spot only on a preheating region of the workpiece according to the movement direction of the cutter, wherein a circular region around the cutter is formed by the preheating region and a non-preheating region, the preheating region is located ahead of the cutter in the process path, and the non-preheating region is located behind the cutter in the process path, and wherein the laser spot is provided to move from one end to the other end of the preheating region for preheating the workpiece in the preheating region when the cutter processes the workpiece along the process path.

2. The laser preheating control method in accordance with claim 1, wherein the laser controller is coupled to the laser source and is configured to selectively light the laser source for forming the laser spot only on the preheating region of the workpiece.

3. The laser preheating control method in accordance with claim 2, wherein the laser controller is coupled to a rotation angle sensor, the rotation angle sensor and the cutter are mounted on a main shaft of a machine tool, wherein the rotation angle sensor is configured to detect a rotation angle of the cutter, and the laser controller is configured to selectively light the laser source according to the rotation angle of the cutter.

4. The laser preheating control method in accordance with claim 3, wherein the rotation angle sensor is an encoder.

5. The laser preheating control method in accordance with claim 1, wherein an angle of the preheating region ranges between 90 and 180 degrees.

6. The laser preheating control method in accordance with claim 2, wherein an angle of the preheating region ranges between 90 and 180 degrees.

7. The laser preheating control method in accordance with claim 3, wherein an angle of the preheating region ranges between 90 and 180 degrees.

8. The laser preheating control method in accordance with claim 4, wherein an angle of the preheating region ranges between 90 and 180 degrees.

9. A laser preheating control device comprising:
   a laser source configured to output a laser beam to a workpiece, wherein when a cutter processes the workpiece along a process path, the laser beam and the cutter move together relative to the workpiece, and the laser beam is provided to selectively form a laser spot on the workpiece; and
   a laser controller configured to obtain a movement direction of the cutter on the workpiece and form the laser spot only on a preheating region of the workpiece according to the movement direction of the cutter, wherein a circular region around the cutter is formed by the preheating region and a non-preheating region, the preheating region is located ahead of the cutter in the process path, and the non-preheating region is located behind the cutter in the process path, and wherein the laser spot is provided to move from one end to the other end of the preheating region for preheating the workpiece in the preheating region when the cutter processes the workpiece along the process path.

10. The laser preheating control device in accordance with claim 9, wherein the laser controller is coupled to the laser source and is configured to selectively light the laser source for forming the laser spot only on the preheating region of the workpiece.

11. The laser preheating control device in accordance with claim 10, wherein the laser controller is coupled to a rotation angle sensor, the rotation angle sensor and the cutter are mounted on a main shaft of a machine tool, wherein the rotation angle sensor is configured to detect a rotation angle of the cutter, and the laser controller is configured to selectively light the laser source according to the rotation angle of the cutter.

12. The laser preheating control device in accordance with claim 11, wherein the rotation angle sensor is an encoder.

13. The laser preheating control device in accordance with claim 9, wherein an angle of the preheating region ranges between 90 and 180 degrees.

14. The laser preheating control device in accordance with claim 10, wherein an angle of the preheating region ranges between 90 and 180 degrees.

15. The laser preheating control device in accordance with claim 11, wherein an angle of the preheating region ranges between 90 and 180 degrees.

16. The laser preheating control device in accordance with claim 12, wherein an angle of the preheating region ranges between 90 and 180 degrees.

* * * * *